United States Patent [19]

Crabtree

[11] Patent Number: 4,627,946
[45] Date of Patent: Dec. 9, 1986

[54] METHOD AND MOLDING APPARATUS FOR MOLDING EXPANDED POLYSTYRENE ARTICLES HAVING SMOOTH SURFACES

[75] Inventor: Larry V. Crabtree, Kitchener, Canada

[73] Assignee: Morval-Durofoam Ltd., Ontario, Canada

[21] Appl. No.: 667,067

[22] Filed: Nov. 1, 1984

Related U.S. Application Data

[63] Continuation-in-part of Ser. No. 548,957, Nov. 7, 1983, abandoned.

[51] Int. Cl.$^4$ .............. C08J 9/22; C08J 9/34
[52] U.S. Cl. .................. 264/51; 264/45.5; 264/335; 264/DIG. 14; 264/DIG. 65; 425/4 R; 425/437
[58] Field of Search ............ 264/51, 53, 45.5, 335, 264/DIG. 65, DIG. 14; 425/4 R, 437

[56] References Cited

U.S. PATENT DOCUMENTS

| | | | |
|---|---|---|---|
| 3,141,192 | 7/1964 | Benedetto | 425/451 |
| 3,156,015 | 11/1964 | Harrison | 425/4 R X |
| 3,193,876 | 7/1965 | Thompson | 73/198 |
| 3,225,126 | 12/1965 | Bridger | 264/51 |
| 3,235,908 | 2/1966 | Thompson | 425/4 R |
| 3,264,381 | 8/1966 | Sterens | 264/45 |
| 3,809,735 | 5/1974 | Cotterell | 264/51 |
| 3,837,769 | 9/1974 | Erlenbach | 425/4 R |
| 3,941,528 | 3/1976 | Cotterell | 264/51 X |
| 4,081,225 | 3/1978 | Yaita | 425/4 |
| 4,192,638 | 3/1980 | Lezier et al. | 264/51 X |
| 4,233,006 | 11/1980 | Pamas | 425/4 |
| 4,327,045 | 4/1982 | Nishikawa et al. | 264/51 |
| 4,382,757 | 5/1983 | Roy et al. | 264/51 X |
| 4,482,306 | 11/1984 | Hahn | 264/51 X |

FOREIGN PATENT DOCUMENTS

| | | |
|---|---|---|
| 597175 | 5/1960 | Canada . |
| 1102067 | 6/1981 | Canada . |
| 2379367 | 9/1978 | France . |
| 2449518 | 10/1980 | France ............... 425/4 R |

Primary Examiner—Philip Anderson
Attorney, Agent, or Firm—Sim & McBurney

[57] ABSTRACT

A mold for use in heat expanding prefoamed polystyrene beads to form a part of a predetermined shape is disclosed. The mold comprises a cavity defined by separable mold wall portions. Each mold wall portion has on its exterior a chamber into which a heating medium is introduced to heat the mold walls and also into which cooling medium is introduced to cool the walls. A plurality of nozzles are provided in the mold walls and a corresponding plurality of tubes interconnect the nozzles to a manifold located in the corresponding chamber. A pressurized heating medium is introduced to the manifold whereby the heating medium is injected into the cavity to expand prefoamed polystyrene beads in the cavity. A device is provided on the manifold for the selective removal of condensate from the manifold. The mold construction provides for an economical, readily manufactured unit.

22 Claims, 5 Drawing Figures

METHOD AND MOLDING APPARATUS FOR MOLDING EXPANDED POLYSTYRENE ARTICLES HAVING SMOOTH SURFACES

This is a continuation-in-part application of application Ser. No. 548,957 filed Nov. 7, 1983 and now abandoned.

FIELD OF THE INVENTION

This invention relates to the manufacture of expanded prefoamed resin beads into parts of a predetermined shape and the mold therefor.

BACKGROUND OF THE INVENTION

Techniques for molding expandable resin beads vary considerably. The primary constituent for the expandable resinous beads is polystyrene. Many products have been formed for a variety of uses because of the high insulating properties of the expanded polystyrene beads and its flotation properties.

In the art of expanding prefoamed resinous beads, a cavity is defined by separable mold parts. Steam is injected into the cavity usually by the use of core vents which have relatively large openings to permit the introduction of steam into the beads contained in the cavity. The resultant expanded foam product has numerous surface markings of the core vent shape In the art of molding products using expanded resinous materials, there is a significant demand for an expanded foam part which has a smooth surface. An example for this demand is in the requirements of "evaporative" casting as disclosed in Canadian Pat. No. 597,175. The technique includes embedding an expanded polystyrene part in molding sand and pouring into the part molten metal to burn and replace the area defined by the part with molten metal which cools to form the shape of the part. The metal reproduces every imperfection on the foam part surface, thereby necessitating a smooth part surface.

Canadian Pat. No. 1,102,067 discloses a method whereby a smooth surface for the expanded fused polystyrene bead structure is disclosed. The cavity wall is provided with a smooth permeable material, such as a sintercore metallic material. The expanded product, when removed from the mold, has an essentially smooth surface as provided for by the very small passages in the permeable walls of the sintercore metallic material.

Another technique, which results in a smooth surface product, is a "dry molding" technique which involves the use of small pinhole size apertures for injecting steam amongst the beads contained in the cavity to cause their expansion. In the dry molding technique, an elaborate chamber system is required having machined channels to isolate the steam which is used to heat the cavity walls from the steam which is injected amongst the contained resin beads. This arrangement, particularly when complex shapes are to be made, results in a very costly mold structure which cannot be readily modified and limits the location of the pinhole vents for injecting pressurized steam into the prefoamed beads.

An example a complex machined mold structure, which isolates the steam supply used, is disclosed in Bridges et al, U.S. Pat. No. 3,225,126.

In an effort to rid formed expanded styrofoam bead parts of surface imperfections, Yaita et al, U.S. Pat. No. 4,081,225, discloses a self-closing nozzle for delivering steam injected into the preheated, pre-expanded beads in a cavity mold. The difficulty with this system is that impurities in the steam supply and in the prefoamed bead supply may collect beneath the check valve arrangement and prevent full closure of the valve thereby resulting in the unwanted surface imperfections.

The mold structure, according to this invention, overcomes the above problems in providing an economical, readily manufactured mold for prefoamed resin beads.

SUMMARY OF THE INVENTION

According to an aspect of the invention, a mold for use in heat expanding prefoamed resin beads to form a part of a predetermined shape comprises a cavity defining the predetermined part shape. The cavity is provided by separable opposing mold wall portions defined by inner surfaces of the wall portions. The mold has a chamber defined exteriorly of and associated with each of the wall portions. Means introduces a heating medium into each of the chambers to heat the corresponding wall portion. Means introduces a cooling medium into the same chamber to cool the corresponding wall portion after heating is completed.

A plurality of nozzles are provided in at least one of the wall portions and a corresponding plurality of tubes interconnect the nozzles to a manifold located in the corresponding chamber for fluid communication between the respective nozzles and manifold. A pressurized heating medium is introduced to the manifold whereby the heating medium is injected into the cavity to expand prefoamed resin beads in the cavity. Means is in fluid communication with the manifold to provide a controlled discharge of steam and condensate from said manifold. The nozzles are each of a size having an opening of cross-sectional area which is sufficiently small to preclude formation of evident surface marks on the formed part in the vicinity of each nozzle opening.

This arrangement for isolating the steam for use in causing expansion of the prefoamed resin beads and for controlling the length of time that the pressurized steam is injected into the cavity provides superior control in forming the product and the moisture content thereof. One can selectively locate the nozzles and provide pressurized steam thereto in a simple manner where the nozzle locations can be readily changed in the mold parts.

According to another aspect of the invention, a method of forming an expanded foamed resin part of a predetermined shape comprises introducing prefoamed resin beads into the partially open mold cavity of the predetermined shape. The resin beads are introduced into the cavity of the mold. A heating medium heats the wall portions. The mold cavity is sealed and pressurized heating medium is injected momentarily through the nozzles into the cavity to expand the resin beads until they fuse and form the desired part. At least during the step of injecting a heating medium through the nozzles, a continuous removal of any condensate formed in the manifold is provided. A cooling medium is introduced into the chambers to cool the wall portions at least until the formed part is cooled sufficiently for removal. The mold is opened and the formed part removed.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
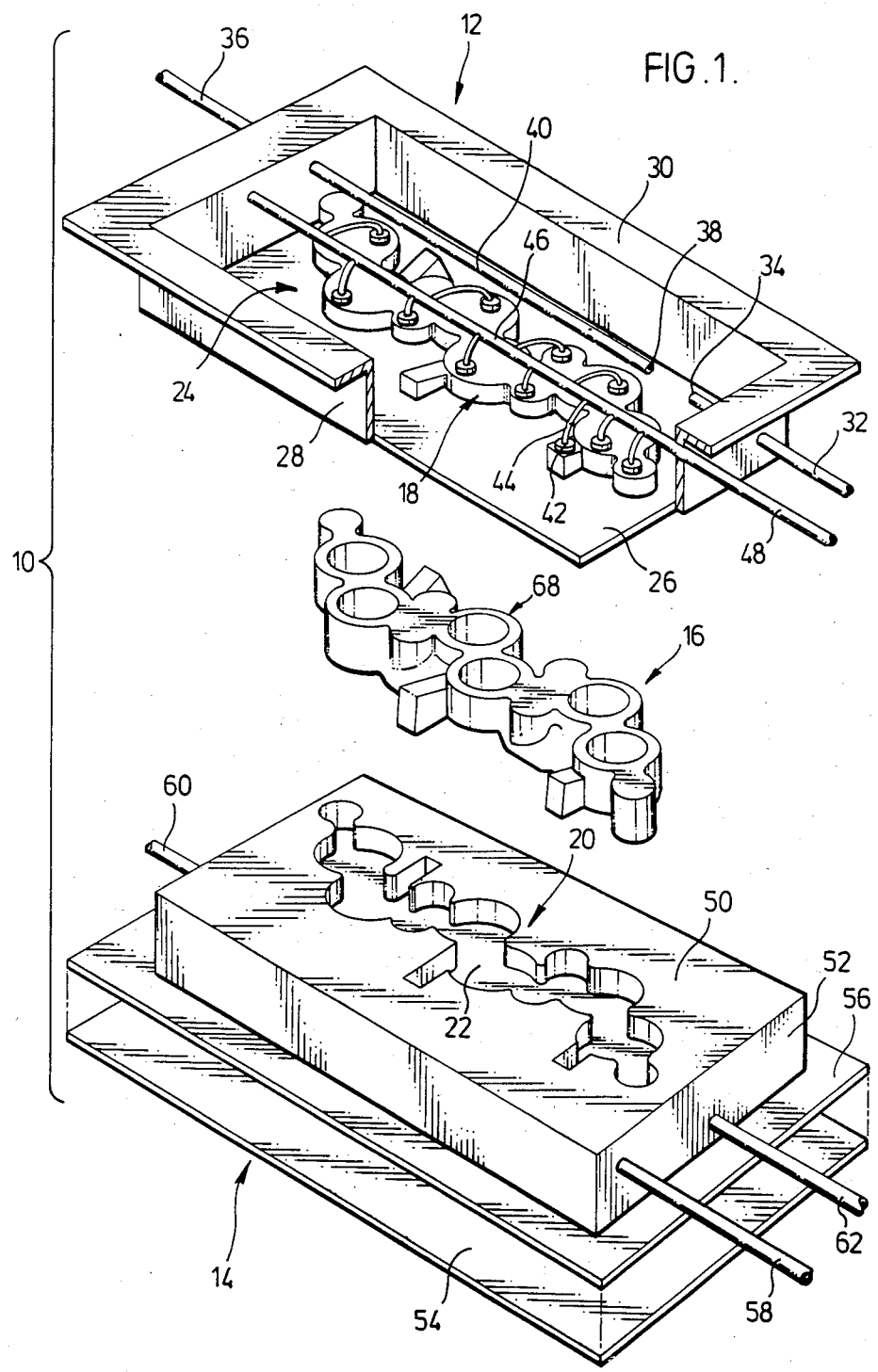
FIG. 1 is an exploded perspective view of the mold according to this invention.

The mold 10, according to a preferred embodiment of the invention as shown FIG. 1, comprises separable mold parts 12 and 14 for molding a part 16 of predetermined shape. The mold 12 comprises a cavity wall 18, the underside of which is shown in mold part 12 at 20. The mold cavity is defined by the inner surface 22 of each mold wall portion 18 and 20. When the separable mold parts 12 and 14 are pressed together, the cavity defined by the inner surfaces 22 of the mold cavity walls 18 and 20 is the same shape as the part 16.

Provided exteriorly of the mold wall portion 18 of mold part 12 is chamber 24. The chamber 24 is defined by planar wall 26 of the mold surrounded by peripheral upstanding walls 28. A plate portion, not shown for mold part 12, is secured to the upper flange 30 to enclose the chamber 24.

Tubing 32 is provided which extends through the chamber upright wall portion 28 with an opened end 34. The tube 32 provides the means for introducing a heating medium into the chamber 24 so as to heat the mold wall portion 18 prior to and during the injection of prefoamed resinous beads into the cavity.

Tube 36 extends through the chamber upright wall 28 and into the chamber. The tubing 36 has a sealed end 38 and along its length are provided a plurality of apertures 40. Pressurized cooling medium, such as water, is introduced to the tube 36 and by way of the apertures 40 directs a spray onto the mold wall portion 18 to cool it prior to removal of an expanded part 16 from the mold.

Figure 3:
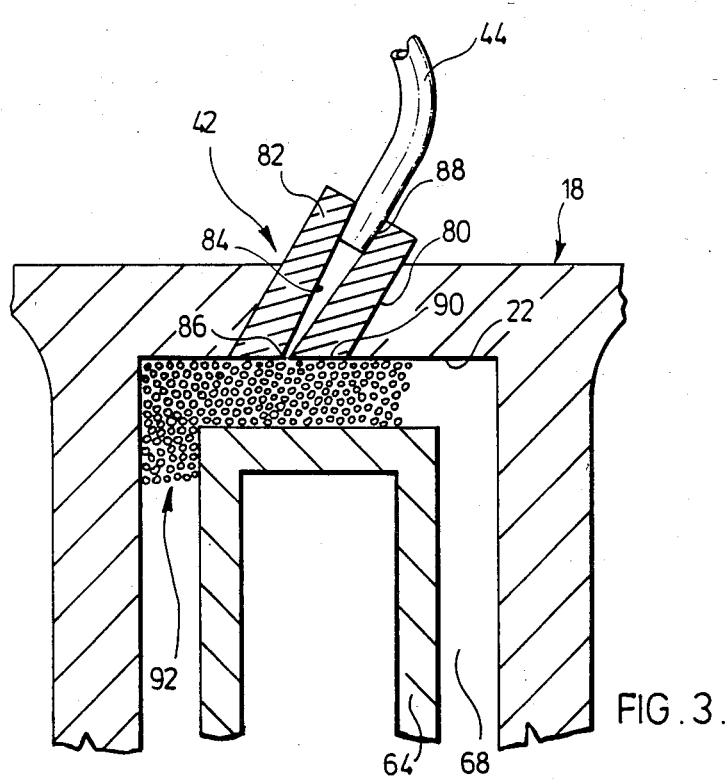
FIG. 3 is an enlarged detail showing the location of a nozzle in the mold cavity wall.

A plurality of nozzles 42, the detail of which is shown in FIG. 3, is provided in the mold wall portion. For each nozzle 42, a tube 44 which has flexible characteristics interconnects the nozzle to a manifold 46 which is provided in chamber 24 and extends therealong. A tube 48 which is an extension of manifold 46, extends through the upright wall 28 of the mold part 12. A pressurized heating medium is introduced via tube 48 to the manifold 46 and thus through nozzles 42 so as to inject the heating medium at desired locations into the cavity to cause expansion of the prefoamed resinous beads in the cavity.

Figure 2:
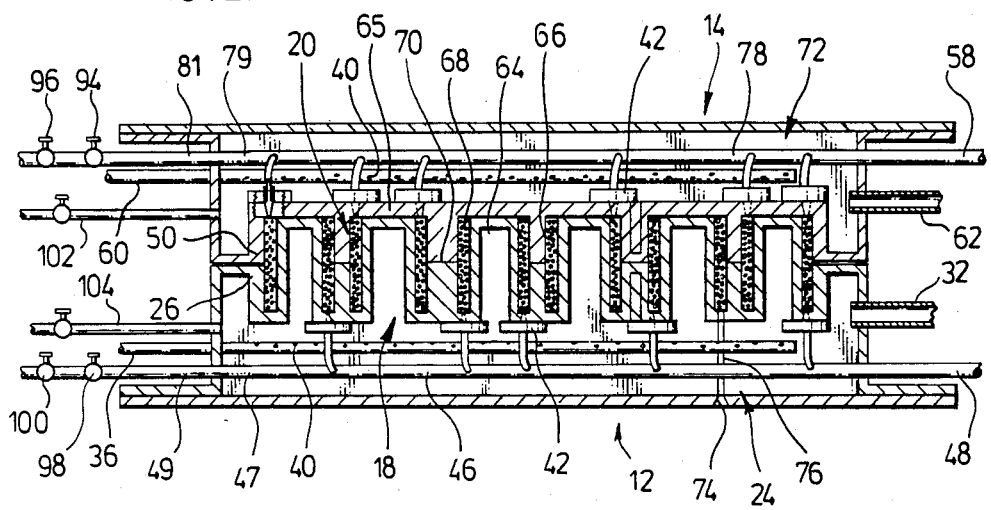
FIG. 2 is a cross-section of the closed mold of FIG. 1.

Mold part 14 has a structure similar to that of mold part 12. The chamber exterior of the mold wall portion 20 is defined by plate 50 with peripheral upstanding walls 52. A plate 54 is secured to the flange 56 to enclose the chamber. As with mold part 12, tube 58 extends through wall 52 for introducing a heating medium to the chamber when required. Tube 60 extends through the wall 52 and through the chamber. The tube 60 has a plurality of apertures. Cooling medium is introduced via tube 60 and sprayed through the apertures onto the mold wall portion 20 to cool it when desired. Either of tubes 48 and 58 extend through wall 52 to form the respective manifolds. A plurality of nozzles are located in mold wall portion 20. A plurality of tubes, which may be flexible, interconnect the manifold to the nozzles, details of which are shown in FIG. 2.

It is readily apparent from FIG. 1 that the apparatus according to this invention provides a mold construction which retains the pressurized heating medium as injected into the cavity to cause expansion of the prefoamed resin beads totally independent at all times from the heating medium used to heat the walls of the cavity. This provides a far superior molded product 16 which is considerably drier and dimensionally more stable than the product made by prior core vented apparatus.

The arrangement of the manifold with the preferred flexible tubing and individual nozzles permits the location of the nozzles at desired points in the mold walls. This provides the selective injection of the heating medium into the prefoamed resin beads in the cavity to optimize on the effect of the heat in expanding the resin beads. This is particularly advantageous in the molding of complex shaped parts.

The resin beads used are those of the type which are partially foamed; however when subjected to additional heat will continue to expand and fuse to take on the shape of the cavity walls in which the resinous deads are introduced. Preferably the prefoamed resin beads are polystyrene beads which have been prefoamed to a density in the range of 1 to 10 lbs. per cubic foot. Such prefoamed polystyrene beads may be obtained from many sources, such as those sold under the Trademark 271T from Arco Polymer, and BASF #620 as sold by BASF Canada Ltd, TEXSTYRENE T BEAD and HUECHT #1401.

By use of the manifold arrangement, a complex shape for the cavity wall may be formed without any difficulty in independently applying the heating medium to the cavity. This arrangement also allows for changes in the mold wall as required by a desired change in the part shape. The nozzle can be moved if needed due to the change without requiring extensive machining of the mold wall.

Referring to FIG. 2, the mold parts 12 and 14 are engaged to demonstrate their interrelationship. Mold part 12 has extending upwardly within its cavity wall 18 a plurality of hollow core insert walls 64 which extend into the recesses 66 of mold part 14. In so doing, cavity sections 68 are defined. The core inserts are shaped in a manner to provide walls 64 of essentially uniform thickness. The uniform wall thickness for the cavity wall portions 64 ensure essentially uniform transfer of heat from the heating medium in the chambers. The machined surfaces of plates 26 and 50 contact one another at the mold parting line 70 to close and thereby define the mold cavity.

Figure 4:
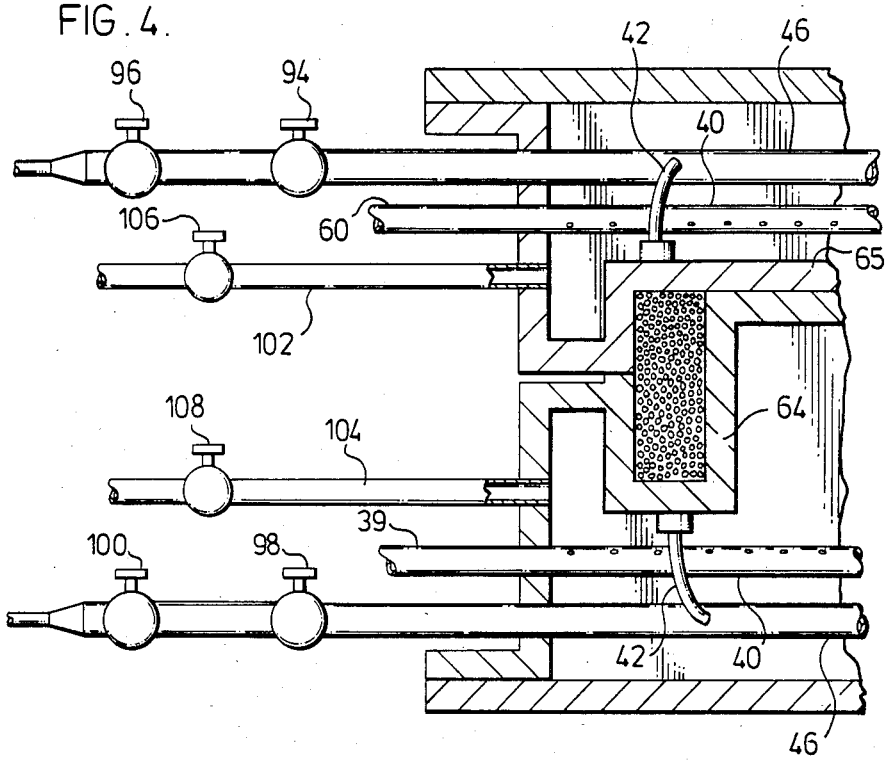
FIG. 4 is an enlarged view of an end portion of the mold section of FIG. 2.

As shown in the enlarged view of FIG. 4, the manifolds 46 and 78 extend through the mold wall and are each provided with a valving arrangement. Manifold 46 is provided with a multi-stage valving 98, 100. Similarly, manifold 78 is provided with a multi-stage valving 94, 96. These valving arrangements are used to provide for removal of any condensate in the manifold during the process of expanding prefoamed beads in the heated mold cavity. Condensate will normally gather in the manifolds 46 and 78 once the cooling medium is introduced to the respective chambers. The cooling medium causes any steam in the manifold to condense. This can become a problem should the condensate, particularly large droplets, pass through the tubes 42 and be injected with the steam for expanding the prefoamed beads. Any water present can cause surface imperfections in the expanded foamed part. Each valving arrangement 94, 96 and 98, 100 may be adapted to be controlled electronically in a manner to determine the rate of discharge of steam and condensate from the manifold during steam injection through the nozzles into the cavity. The valve arrangements may be in the form of a three-stage valve having full open, restricted open and fully closed positions. The process controller for the molding equipment may be programmed to select and actuate the proper opening for the valves 94, 96 and 98, 100 depending upon the the phase of the cycle in molding the part. The three-stage valves 98, 100 are controlled by the process controller in a manner to inject essentially "dry" steam into the cavity and subsequent removal of any condensate from the manifolds.

After injection of steam into the chambers to heat the mold and the spraying of coolant through lines 36 and 60, removal of the coolant medium and any steam condensate is provided through outlets 102 and 104 in the respective chambers. Each outlet is provided with a respective valve 106, 108. These valves 106 and 108 may also be controlled by the process controller for the molding equipment to open them after the cooling phase of the molding cycle.

Figure 5:
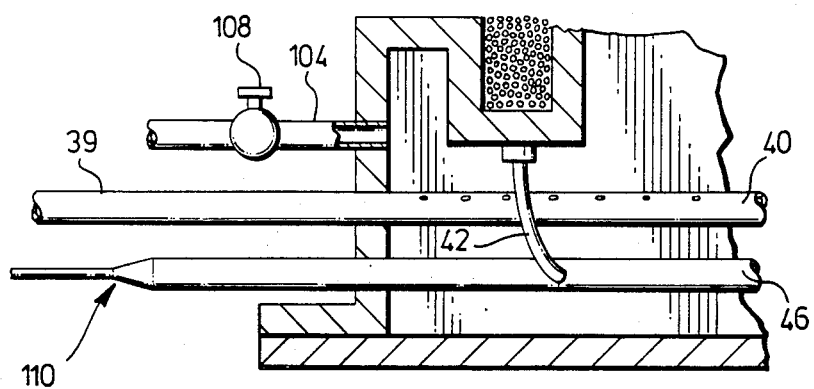
FIG. 5 is an enlarged portion of an end of the section of FIG. 2 showing an alternative arrangement for removing condensate from the mold interior.

FIG. 5 illustrates an alternative arrangement for removing condensate from the manifolds. As specifically exemplified with respect to manifold 46, the extremity thereof exterior of the mold wall includes a capillary tube 110. The orifice of the capillary tube is sized to provide adequate back pressure allowing the pinhole-size nozzles to inject sufficient quantities of steam into the cavity while the capillary tube remains effective as a condensate relief. In this embodiment of operation particularly with respect to the outlets for removing condensate from the chambers, the mold is oriented so that the capillary tube and the condensate outlets are positioned at the lowermost portion of the mold when the mold is used in a molding machine. In this manner, any condensate collecting in the manifold will drain through the capillary tube for each manifold. Any remaining condensate can be blown out through the capillary tubes during the injection of steam through the nozzles or subsequent use of pressurized air through the nozzles. As a result with the use of the capillary tube or the other devices as discussed with respect to FIG. 4 any condensate is discharged from the manifold lines to avoid injecting water with the steam into the polystyrene beads.

The mold walls may be constructed from various suitable materials having sufficient tensile and compression strength and the necessary heat conduction properties to provide for rapid heat transfer from the heating medium to the prefoamed material in the mold cavity. Examples of suitable mold wall materials are aluminum alloys, magnesium alloys, brass, bronze, nickel and the like. It is desirable to provide mold walls which are uniform in thickness to ensure an even transfer of heat from the heating medium to the material within the cavity. For a mold constructed of aluminum alloys, a suitable wall thickness is in the range of ⅜ of an inch.

Preferably, the tubing used in connecting the manifold with the nozzles is of a flexible nature to facilitate various angular positioning of the nozzles. The flexible tubing is considerably narrower than the manifold and may be coiled to accommodate expansion and contraction in the tubes during the heating and cooling cycles of the mold. The requirement in designing the manifold and tubes is that the cross-sectional area of the manifold should be greater than the sum of the cross-sectional areas of all tubes which feed off the manifold. This ensures that the pressurized fluid in the manifold is equally distributed and ejected through all of the nozzles. By way of providing means for removal of condensate from the manifold and thereby minimizing condensate in the tubes, an equal distribution of the heating steam to be injected within the prefoamed beads is accomplished.

The method, as applied to the mold 10, comprises aligning the mold parts 12 and 14 and partially closing them so as to leave a small gap at the parting line 70 of the contacting mold surfaces 26 and 50. A filling device (not shown) is connected to opening 74 to introduce to the cavity 68 via tube 76 the prefoamed polystyrene beads. The beads are injected by the gun until they displace all air in and thereby fill the cavity. The air escapes through the narrow opening between the mold parts at the parting line 70.

Prior to the introduction of the beads, heating medium is introduced to the respective mold part chambers 24 and 72 by the tubes 32 and 62. The heating medium is preferably in the form of steam which may build up to a pressure of approximately 15 to 20 psig. During this phase of the cycle, the valves 106 and 108 for the chamber condensate outlet are closed. Valves are provided exterior of the mold to control the introduction of steam to the chambers 24 and 72 during the heating cycle of the mold walls. This will heat the mold cavity walls 18 and 20 to a relatively stable temperature of approximately 110° to 120° C. to cause the introduced beads contacting the wall portions to at least soften and commence fusion of the beads. The beads may be introduced to the cavity either during elevation of the wall temperatures or after the walls are up to temperature.

To cause expansion of the beads to form the part 16, a pressurized heating medium preferably steam is injected via the nozzles 42. Valves are provided exterior of the mold in tubes 48 and 58 to control the supply of pressurized steam to the manifolds 46 and 78. Steam is injected via the nozzles into the cavity for a period of one to five seconds depending upon the shape of the part, its wall thickness and raw material specifications. This momentary injection of the pressurized steam into the cavity causes an immediate expansion of the prefoamed polystyrene beads to reproduce the shape of the cavity.

During the momentary injection of the pressurized steam into the manifold, with the arrangement of FIG. 5, the capillary tube 110 provides for continuous exhausting or discharge of any condensate within the respective manifolds 46 and 78. However, as explained, the capillary tube orifice is of a size to ensure that there is sufficient back pressure within the manifold to provide an equal distribution of steam injection through the nozzles into the mold cavity. This continuous discharge of any condensate from the manifolds may be accomplished with the valving arrangements 94, 96 and 98, 100 for the manifolds 46 and 78 by setting the valves in their partially opened positions. This may be accomplished by way of the programmable controller for the molding apparatus controlling servo devices on the valves. As a result during the phase of steam injection to within the cavity, continuous discharge of any condensate which has developed in the manifolds, usually prior to the steam injection, is discharged.

After the brief injection of steam into the cavity, the next phase of the cycle is to cool the mold walls. The steam supplied to the chambers 24 and 72 is removed, if it has not already been removed during the injection of the steam to within the cavity. The mold walls 18 and 20 are cooled by introducing a cooling medium to tubes 36 and 60. Valves exterior of the mold control the flow of cooling medium to lines 36 and 60. The apertures 40 in the tubes spray the cooling medium, such as water, onto the mold walls whereby conductive cooling of the part 16 is commenced. Depending upon the wall thickness of the part and the heat conductivity of the mold walls, the part may be cooled for anywhere from five seconds to as long as required before the mold is opened to eject the part. During the cooling cycle valves 106 and 108 may be opened to permit gravity discharge of any steam condensate and cooling medium from the chambers 24 and 72.

After the cooling phase of the cycle is completed and the part is sufficiently cool to permit opening of the mold, the manifold nozzle arrangement provides an advantage in part lay-over and ejection from the mold cavities. Prior to or at the time of releasing the mold, pressurized air may be fed to one of the manifolds 46 or 78 to provide air pressure at the face of the part adjacent the cavity mold wall nozzles. The manifold to which the pressurized air is supplied ensures that the part is released from the corresponding cavity mold wall, thereby laying over the part to the other cavity as the mold is opened. The pressurized air fed to the respective manifold is controlled to not produce collapse in the part surface which could be caused by high pressure blasts through the nozzles. As is appreciated during the cooling process, most of the steam remaining within the manifold and tubes will condense. By supplying pressurized air to the manifold, the respective control arrangement for condensate discharge may be partially opened to allow the pressurized air to also discharge any condensate in the manifold out of the control valving arrangement, whether it be the set up of FIG. 4 or FIG. 5. Any condensate which is settled in the flexible tubes is carried by the pressurized air out through the corresponding nozzle. The pinhole size of the nozzles immediately atomizes the condensate carried with the pressurized air. Due to the heated walls of the cavity, the atomized condensate is vaporized to minimize any condensate on the mold wall surfaces. This maintains the "dry molding" principle while accomplishing it in a far more economical manner than that achieved by the prior art, such as disclosed in Bridges et al, U.S. Pat. No. 3,225,126 which requires an elaborate machined structure.

After the part is laid over to the other cavity wall and the mold is completely opened, pressurized air may be introduced to the other manifold. This will assist in releasing the part from the mold cavity wall and by use of mechanical ejectors, if needed, the part can be completely ejected from the mold to allow the next cycle of the mold machine to proceed. At this point in time, essentially all condensate within the manifolds and tubing is removed ready for the next cycle. Furthermore, the pinhole nozzles atomizing any condensate within the tubes causes immediate evaporation so that condensate does not remain on the faces of the mold wall. This avoids condensate droplets within the mold cavity when the fresh set of prefoamed beads are introduced to the mold cavity.

It is appreciated that the mold of FIG. 2 may be used with any conventional machine for use in forming expanded polystyrene parts. The machine may be computer programmed to provide for the various method steps or phase of the molding cycle.

Turning to FIG. 3, a detail of a nozzle 42 as located in the mold wall 18 is shown. The mold wall has formed therein an aperture 80 through to the interior of the cavity 68. A bushing 82 is press-fitted into the aperture 80. A tapered nozzle 84 is machined into the bushing 82 to provide a nozzle opening 86. The tubing 44 which interconnects the nozzle 84 to the manifold 46 is press-fitted into the bushing at 88 to form a fluid tight seal with the nozzle 84. The other end of the tube 44 may be welded to the manifold tubing 46. The tubing 44 may be of many different configurations to provide for its flexible characteristics. The tubing may have rigid portions with flexible elbow portions to provide for the needed angles in the tube to connect the manifold to a particular nozzle. A more convenient approach is to use a copper alloy tubing which is inherently flexible alongs its length. Providing the manifold is also of copper alloy, the tubing may be soldered to the manifold. The lower end of the bushing 90 is machined flush with the wall surface 22 of the mold part.

An additional feature of the nozzle-manifold arrangement is that the nozzle bushings 82 may be located in any direction relative to the cavity 68. Depending upon the shape and size of the part, it may be necessary to inject steam at an angle relative to the cavity 68. This is readily accomplished where the bushing in press-fitted into the opening 80 and machined flush with the inner surface 22 of the cavity wall. At a later time, should there be a change in the shape of the mold, the bushing 82 may be relocated with the opening 80 sealed off and/or the angle changed as desired without necessitating scrapping of the mold and preparing a new mold.

The nozzle opening 86, according to a preferred embodiment, may be of a restricted size so that when the beads 92 in the cavity 68 are expanded, the opening 86 does not form a noticeable surface imperfection in the part 16. It has been found that a nozzle opening having a cross-sectional surface area equivalent to a circular opening of diameter ranging from 0.010 inches up to 0.026 inches provides a satisfactory part, while at the same time introducing sufficient steam to effect the expansion of the prefoamed polystyrene beads.

By using the pinhole nozzles as connected to a common manifold located within each chamber of the respective mold half, through a series of flexible tubes, the integrity of the mold wall is maintained between its cavity and associated chamber. This permits thinner mold cavity wall portions to increase the rate of heat conduction from the heating medium to the prefoamed beads placed within the mold cavity. The flexible tube construction allows for the mechanical expansion and contraction of the mold and its components during the rapid heating and cooling phases of the process as accomplished by this mold construction. This form of mold construction provides an extremely economical and efficient method of producing a molded polystyrene part with the desired surface finish, such as required in the evaporative casting techniques and other thin-wall molding applications.

Although various preferred embodiments of the invention have been described herein in detail, it will be understood by those skilled in the art that variations may be made thereto without departing from the spirit of the invention or the scope of the appended claims.

I claim:

1. A method of forming an expanded plastic part of a predetermined shape from prefoamed resin beads comprising introducing prefoamed resin beads into a partially open mold cavity of said predetermined shape, said cavity being defined by inner surface of separable mold wall portions, said mold having a chamber defined exterior of and associated with each of said wall portions, a plurality of nozzles provided in at least one of said wall portions and a corresponding plurality of tubes interconnecting said nozzles to a manifold located in the corresponding chamber for fluid communication between the respective nozzle and manifold, said manifold being spaced from a corresponding said wall portion, each of said nozzles having an opening of cross-sectional area which is sufficiently small to preclude formation of evident surface marks on the formed part in the vicinity of each nozzle opening, introducing into said chamber a heating medium to heat said wall portions to a desired molding temperature with said cavity closed and filled with resin beads, injecting a pressurized steam from said manifold through said nozzles into said cavity to expand said resin beads until they fuse and form the desired part, said injection of said steam continuously removing from said manifold any condensate formed in said manifold through means in fluid communication with said manifold for providing a controlled continuous discharge of steam and condensate from said manifold, said manifold discharge means being provided on said manifold at its lowermost position when in use, removing said heating medium from said chambers and introducing into said chambers a cooling medium to cool said wall portions at least until said formed part has cooled sufficiently for removal, and opening said mold and removing the formed part from said cavity by separating said mold wall portions.

2. A method of claim 1, wherein after cooling said part, introducing pressurized air into one of said manifolds as said mold is opened to facilitate removal of said part from one of said mold wall portions and subsequently introducing pressurized air into the other of said manifolds to facilitate ejection of said part from the other of said mold wall portions, said steps of introducing pressurized air into said manifolds removing any condensate from said tubes.

3. A method of claim 1, wherein said nozzles are selectively located in said wall portion to optimize the effect the injected steam has on expanding the resin beads.

4. A method of claim 1, wherein said steam is injected into said resin beads in the cavity for approximately one to five seconds depending upon the thickness of the part to be formed.

5. A method of claim 1, wherein heating medium is introduced to said chamber to preheat the corresponding wall portion prior to introducing resin beads into said cavity.

6. A method of claim 1, wherein said steam is injected through a nozzle having an opening of a cross-sectional surface area equivalent to a circular opening of a diameter ranging from 0.010 inches up to 0.028 inches.

7. A method of claim 4 or 6, wherein said pressurized steam is of approximately 15 to 20 psig.

8. A method of claim 1, 3 or 4, wherein said prefoamed heat expandable resin beads are prefoamed polystyrene beads.

9. A method of claim 1, wherein said heating medium is introduced into said chamber to preheat said mold wall portions prior to filling said cavity with resin beads.

10. A method of claim 9, wherein said mold wall portions are heated with said heating medium during filling of said cavity with said resin beads and while said steam is injected into said cavity.

11. A mold for use in heat expanding prefoamed resin beads to form a part of a predetermined shape, said mold comprising a cavity defining said part of predetermined shape, said cavity being provided by separable wall portions of said mold and defined by inner surfaces of said wall portions, said mold having a chamber defined exterior of and associated with each said wall portion, means for introducing a heating medium into each of said chambers to heat the corresponding wall portion, means for introducing a cooling medium into each of said chambers to cool the corresponding wall portion when needed, means for removing steam, condensate and cooling water from each of said chambers, a plurality of nozzles provided in at least one of said wall portions and a corresponding plurality of tubes interconnecting said nozzles to a manifold located in the corresponding chamber for fluid communication between the respective nozzle and manifold, said manifold being spaced from said corresponding wall portion, each of said nozzles being flush with the corresponding inner surface of the respective wall portion and having a nozzle opening of cross-sectional area which is sufficiently small to preclude formation of evident surface marks on the formed part in the vicinity of each nozzle opening, means for introducing a pressurized steam to an end of said manifold whereby such steam is injected through said nozzles into said cavity to expand prefoamed resin beads when present in said cavity and means in fluid communication with said manifold for providing a controlled continuous discharge of steam and condensate from said manifold, said manifold discharge means is provided on said manifold at its lowermost portion when said mold is in use.

12. A mold of claim 11, wherein each said nozzle opening has a surface area equivalent to a circular opening having a diameter ranging from 0.010 inches up to 0.028 inches.

13. A mold of claim 11, wherein said tubes are of a flexible nature.

14. A mold of claim 11, 12 or 13, wherein the cross-sectional surface area of said manifold is greater than the accumulative cross-section areas of said tubes.

15. A mold of claim 11, 12 or 13, wherein a selected one or more nozzles is angled relative to said inner surface defining said cavity to inject thereby such pressurized heating medium into said cavity at a desired angle.

16. A mold of claim 11, 12 or 13, wherein said manifold is a copper tube having at one end thereof said manifold discharge means, each of said flexible tubes being of copper and connected at one end to said nozzle and at the other end to said copper manifold.

17. A mold of claim 11, wherein said manifold discharge means comprises a valving arrangement which is adjustable between open and closed positions.

18. A mold of claim 11 or 17, wherein means is provided for introducing pressurized air into said manifold.

19. A mold of claim 11, wherein said manifold discharge means comprises a capillary tube extending from said manifold, said capillary tube having an outlet orifice of a size which develops back pressure in pressurized fluids introduced to said manifold and which permits drainage of fluid from said manifold.

20. A mold of claim 16, wherein said means for introducing a cooling medium is a tube extending within said cavity and having a plurality of orifices formed therein to spray pressurized cooling medium onto said cavity walls.

21. A mold of claim 20, wherein a mold outer shell is provided for each mold wall portion to define thereby said chamber, said means for introducing said heating medium comprising a tube extending through and sealingly connected to said mold outer shell, said means for introducing said pressurized steam to said manifold comprising said manifold tube extending outwardly through and sealingly connected to said mold outer shell, said tube for introducing the cooling medium extending outwardly through and sealingly engaged with said mold outer shell, each of said tubes being adapted for connection to the respective source of steam for the wall portions, heating medium for injection into said cavity and cooling medium for said walls.

22. A mold of claim 21, wherein said heating medium for said wall portions is pressurized.

* * * * *